Nov. 3, 1931. J. C. BOHMKER 1,830,013
PLOW BRACKET
Filed March 10, 1928
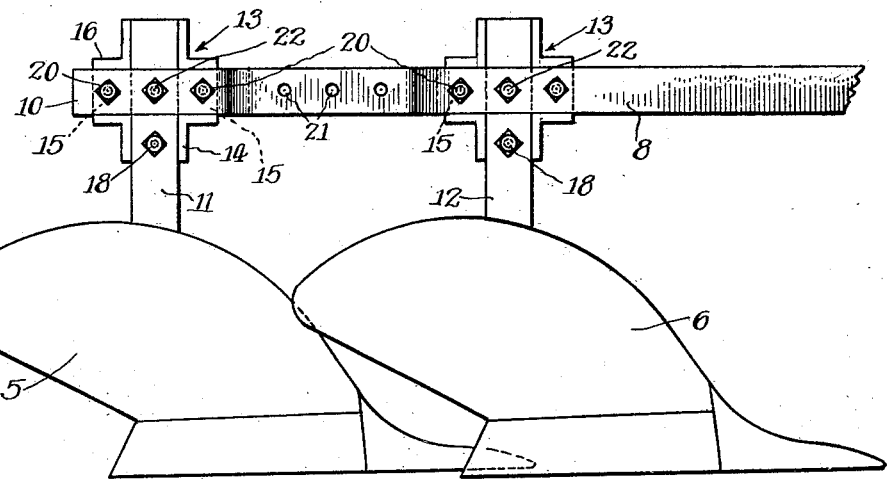
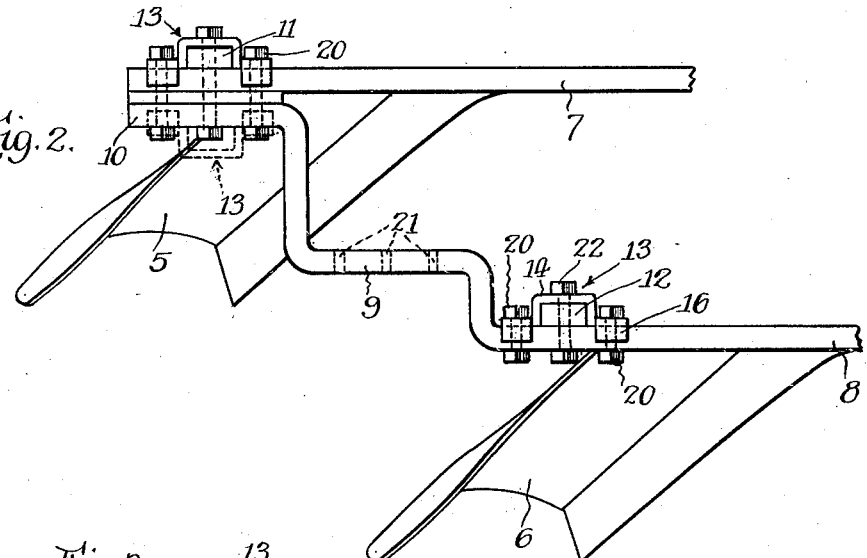
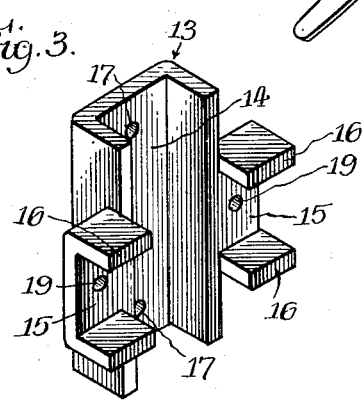
Inventor:
John C. Bohmker,
By Chindahl Packer Karlson
Attys.

Patented Nov. 3, 1931

1,830,013

UNITED STATES PATENT OFFICE

JOHN C. BOHMKER, OF BRADLEY, ILLINOIS, ASSIGNOR TO SEARS, ROEBUCK AND CO., OF CHICAGO, ILLINOIS, A CORPORATION OF NEW YORK

PLOW BRACKET

Application filed March 10, 1928. Serial No. 260,716.

The invention relates generally to plows and more particularly to tractor plows in which one or more plow bottoms are mounted upon a supporting frame.

It is an object of this invention to provide a plow of this character which is supported by means of novel construction so as to be readily and easily adjusted in the field to vary the width of the furrow cut.

Other objects and advantages of the invention will become apparent from the following description and from the accompanying drawings in which:

Figure 1 is an elevational view of a part of a plow frame having two plow bottoms mounted thereon in accordance with this invention.

Fig. 2 is a plan view of the same.

Fig. 3 is a view in perspective of a preferred form of bracket by which the quickly adjustable feature may be attained.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Generally the invention may be applied to any of the types of plows which are known as gang plows and are usually adapted to be drawn by tractor, and I have chosen for the purposes of illustration to show two plow bottoms 5, 6 mounted upon the rear portion of a sturdy plow frame which is supported and operated in the customary manner. Since the supporting and operating means form no part of the present invention they are not shown in the drawings.

The plow frame, in the present embodiment, comprises two spaced side frame members 7 and 8. The rear portion of one of the side members of the frame, in this instance the right hand member 8 (looking toward the front of the plow), is offset laterally toward the other side member one or more times to provide a series of steps. In this embodiment two of such steps 9 and 10 are shown, which provide with the main portion of the frame three parallel frame portions each of which is of a different distance from the opposite frame member 7. Preferably, as shown in Fig. 2, the final step 10 of the frame member 8 lies along the other frame member 7 and is rigidly secured thereto in any suitable manner as by welding or riveting.

The plow bottoms 5, 6 are of a generally well-known construction and are provided with upwardly extending supports in the form of standards 11, 12 which are rigidly secured to the rear sides of the bottoms in any suitable manner, so that when the standards are substantially vertical the shares will be in the proper position to make a cut.

Means is provided for mounting the plow bottoms on the frame, through the medium of the vertical standards, which means is adapted, for the purpose of adjustment, to permit the bottoms to be mounted on either the inner or outer side of the frame member 8 as desired. This means, in the present instance, comprises a bracket generally designated as 13, having an elongated body portion 14 (Fig. 3) of substantially U-shaped cross section. The size of the channel thus formed is preferably such as snugly to receive the share standards 11, 12. On either side of the body portion 14 and extending laterally outwardly therefrom at a position substantially intermediate the ends of the bracket are integrally formed flanges 15. The flanges 15 are substantially the same width as the width of the frame member 8 and have outwardly projecting arms 16 integrally formed on either side thereof. Thus a bracket is provided which in effect presents two perpendicularly intersecting channels, one of which is adapted to receive a bottom standard and the other to embrace three sides of the frame member 8. Morover, the bracket is reversible in that it may be mounted on either side of the frame member.

The base of the body portion 14 of the bracket is suitably apertured as at 17 to receive a bolt 18 by which the bracket and the standard may be detachably secured together. Each of the laterally projecting flanges are also apertured as at 19 to receive bolts 20 which pass through suitably positioned apertures 21 provided in the frame member 8 for securing the bracket to the frame. Preferably, three of the apertures 17 are provided in the body portion of the bracket in such position that the center one of such apertures is also centrally located in line with the apertures 19. Thus, when a plow bottom is mounted on the frame one bolt 22 will pass through the bracket, the standard, and the frame to provide additional rigidity to the assembly. It will be seen by this construction that the plow share is supported upon the frame with great rigidity, displacement thereof in any direction being resisted by the bracket. As shown, the frame member 8 and each of the step portions 9, 10 are provided with a series of the bracket receiving apertures to permit the bracket and one of the bottoms to be mounted thereon.

The operation of the device, it will be seen, is exceedingly simple. In assembling it is only necessary to secure the bracket to the standard or to the frame by the proper bolts and then to place the bracket in proper position relative to the frame or the standard and rigidly bolt the parts in assembled relation. When it is desired to vary the width of the cut of one of the bottoms the bracket may be readily removed from both the frame and the standard, reversed, so as to fit upon the opposite side of the frame and the parts reassembled, as shown in broken outline in Fig. 2.

Thus, the standard will be moved from one side of the frame to the other and the width of the cut of the plow bottom will be varied inwardly or outwardly a distance equal to the thickness of the frame member. In addition a further adjustment may be made by changing the position of the plow bottom from either side of one step to either side of another. Moreover, when two bottoms are mounted on the frame either or both may be adjusted in the manner indicated to vary the total width of the furrow cuts through a considerable distance.

It will be apparent from the foregoing that a very simple means has been provided for mounting one or more bottoms upon a plow frame, which means is capable of easy and rapid adjustment to vary the width of the furrow cut as determined by the nature and condition of the ground to be plowed.

I claim as my invention:

A reversible bracket for securing the standard of a plow share to either side of a frame member, comprising a unitary structure having a channel therein to receive a plow standard, and having a pair of alined channel sections extending in opposite directions from and substantially perpendicular to said first channel and adapted to embrace a frame member.

In testimony whereof, I have hereunto affixed my signature.

JOHN C. BOHMKER.